United States Patent
Becker

(10) Patent No.: US 9,669,721 B2
(45) Date of Patent: Jun. 6, 2017

(54) METHOD AND SYSTEM FOR DYNAMICALLY PROVIDING INFORMATION ABOUT CHARGING STATIONS

(71) Applicant: Gernot Becker, Dortmund (DE)

(72) Inventor: Gernot Becker, Dortmund (DE)

(73) Assignee: RWE AG, Essen (DE)

( * ) Notice: Subject to any disclaimer, the term of this patent is extended or adjusted under 35 U.S.C. 154(b) by 0 days.

(21) Appl. No.: 15/057,895

(22) Filed: Mar. 1, 2016

(65) Prior Publication Data

US 2016/0176307 A1 Jun. 23, 2016

Related U.S. Application Data

(63) Continuation of application No. PCT/EP2014/067018, filed on Aug. 7, 2014.

(30) Foreign Application Priority Data

Sep. 3, 2013 (DE) .......................... 10 2013 014 527

(51) Int. Cl.

| | |
|---|---|
| *H02J 7/00* | (2006.01) |
| *B60L 11/00* | (2006.01) |
| *B60L 11/18* | (2006.01) |
| *G07F 15/00* | (2006.01) |
| *H04W 4/02* | (2009.01) |
| *G01C 21/36* | (2006.01) |
| *G05B 15/02* | (2006.01) |
| *G06Q 10/02* | (2012.01) |

(52) U.S. Cl.

CPC ....... *B60L 11/1846* (2013.01); *B60L 11/1816* (2013.01); *B60L 11/1825* (2013.01);

(Continued)

(58) Field of Classification Search

CPC .......................... B60L 11/1846; B60L 11/1138

(Continued)

(56) References Cited

U.S. PATENT DOCUMENTS

| | | | |
|---|---|---|---|
| 5,790,976 A | 8/1998 | Boll et al. | |
| 6,727,809 B1 * | 4/2004 | Smith | G01C 21/26 320/109 |

(Continued)

FOREIGN PATENT DOCUMENTS

| | | |
|---|---|---|
| DE | 101 46 789 A1 | 4/2003 |
| DE | 10 2010 064 015 A1 | 6/2012 |

(Continued)

*Primary Examiner* — M'Baye Diao

(74) *Attorney, Agent, or Firm* — Reinhart Boerner Van Dueren P.C.

(57) ABSTRACT

A method is provided for dynamically providing up-to-date information about charging stations for electric vehicles. Charging station information including at least one charging station identification assigned to a respective charging station and location information assigned to the respective charging station is stored for multiple charging stations. A charge request containing identification of the mobile station and geographical information for the mobile station is received from a mobile station. A tuple of charging station information from the plurality of items of stored charging station information dependent on at least the received charge request is selected such that the received geographical information is compared with the respective location information of the charging stations and when the result of a comparison is positive the corresponding charging station information is added to the tuple and the tuple is sent to the mobile station using the identification of the mobile station.

16 Claims, 2 Drawing Sheets

(52) U.S. Cl.
CPC ....... B60L 11/1838 (2013.01); B60L 11/1848 (2013.01); G01C 21/3679 (2013.01); G01C 21/3691 (2013.01); G05B 15/02 (2013.01); G06Q 10/02 (2013.01); G07F 15/005 (2013.01); H04W 4/02 (2013.01); B60L 2230/10 (2013.01); B60L 2230/40 (2013.01); B60L 2240/622 (2013.01); B60L 2240/70 (2013.01); B60L 2240/72 (2013.01); Y02T 10/7005 (2013.01); Y02T 10/7088 (2013.01); Y02T 10/7291 (2013.01); Y02T 90/121 (2013.01); Y02T 90/128 (2013.01); Y02T 90/14 (2013.01); Y02T 90/16 (2013.01); Y02T 90/161 (2013.01); Y02T 90/162 (2013.01); Y02T 90/163 (2013.01); Y02T 90/169 (2013.01); Y04S 30/14 (2013.01)

(58) Field of Classification Search
USPC .......................................... 320/109; 701/22
See application file for complete search history.

(56) References Cited

U.S. PATENT DOCUMENTS

| | | | |
|---|---|---|---|
| 8,698,642 B2 * | 4/2014 | Taguchi | B60L 3/12 340/636.1 |
| 9,026,347 B2 * | 5/2015 | Gadh | B60L 11/1842 320/109 |
| 2006/0142915 A1 | 6/2006 | Isono et al. | |
| 2009/0082957 A1 | 3/2009 | Agassi et al. | |
| 2009/0261988 A1 * | 10/2009 | Ramirez Serrano | G07C 9/00182 340/932.2 |
| 2010/0094496 A1 | 4/2010 | Hershkovitz et al. | |
| 2010/0106401 A1 | 4/2010 | Naito et al. | |
| 2012/0158229 A1 | 6/2012 | Schaefer | |
| 2012/0166240 A1 | 6/2012 | Jones et al. | |
| 2013/0046457 A1 | 2/2013 | Pettersson | |
| 2013/0088093 A1 | 4/2013 | Aschenbroich et al. | |
| 2014/0203077 A1 * | 7/2014 | Gadh | H02J 7/00 235/382 |
| 2014/0358749 A1 * | 12/2014 | Williams | G06Q 30/04 705/34 |
| 2015/0298565 A1 * | 10/2015 | Iwamura | G06Q 50/10 701/22 |
| 2016/0149657 A1 * | 5/2016 | Kurihara | G06Q 50/26 340/539.18 |

FOREIGN PATENT DOCUMENTS

| | | |
|---|---|---|
| WO | WO 2013/019989 A2 | 2/2013 |
| WO | WO 2013/053413 A1 | 4/2013 |

* cited by examiner

METHOD AND SYSTEM FOR DYNAMICALLY PROVIDING INFORMATION ABOUT CHARGING STATIONS

CROSS-REFERENCE TO RELATED PATENT APPLICATIONS

This patent application is a continuation of PCT/EP2014/067018, filed on Aug. 7, 2014, which claims priority to German Application No. 10 2013 014 527.9, filed on Sep. 3, 2013, the entire teachings and disclosure of which are incorporated herein by reference thereto.

BACKGROUND OF THE INVENTION

The subject-matter relates to a method and to a system for providing information about charging stations for electric vehicles.

The acceptance of electric vehicles heavily depends on being able to conveniently charge such vehicles. Charging an electric vehicle must not only be possible at home, but also at any time away from home. To that end, efforts are currently being made to establish a network of charging stations. Since charging electric vehicles at charging stations usually, however, takes some considerable time, it is necessary for the availability of the charging station to be guaranteed for a user. In addition, it cannot be expected that in the next few years the concentration of charging stations will be as high as is normal nowadays with a petrol station network, which means that a user will have to routinely look for a charging station away from home. For the user, retrieving the available information about charging stations, which is necessary for him or her, is not a trivial thing. Although there are offers to retrieve locations of charging stations, the respective user is always responsible for looking for charging stations in the right place.

BRIEF SUMMARY OF THE INVENTION

Against this background, the subject-matter was based on the object of providing up to date information about charging stations for electric vehicles dynamically. This object is achieved by a method and system disclosed herein.

It has been recognised that information regarding charging stations can be stored in a central computer. This charging station information can contain at least one charging station identification assigned to a respective charging station and at least one item of location information assigned to the respective charging station. The charging station information can be stored for a plurality of charging stations.

Location information can, for example, be coordinates of the charging station. In addition, for example, information about a radio cell, for example a mobile radio cell, information about "visible" WLAN networks in the vicinity of the charging station, an address including street and town or suchlike can be location information. Such location information can be assigned to each individual charging station and stored together with the respective charging station identification.

It is now possible for a user to locate charging stations by him or her sending from a mobile station a charge request containing at least one identification of the mobile station and one item of geographical information for the mobile station and this being received by a central computer. An identification of a mobile station can, for example, be a telephone number, an email address, a pager number, an International Mobile Subscriber Identification (IMSI) number, a MAC number, an IP address or suchlike. A mobile station can, for example, be a mobile telephone, a smartphone, a tablet computer, a laptop computer, a navigation device, an on-board vehicle computer or suchlike.

Geographical information for the mobile station can have the location of the mobile station. Here, the geographical information can, for example, contain the same information as the above mentioned location information. This is, for example, GPS coordinates, cell information, WLAN network information, street and town or suchlike.

The charging station information is stored in the central computer and a charge request is received by the central computer. Subsequently, a tuple consisting of charging station information can be selected from the plurality of items of stored charging station information. This selection takes place according to the subject matter of the invention dependent on at least the received charge request. Here, in particular, firstly the received geographical information is compared with the respective location information of the charging station. This means that a comparison is made as to which spatial position the mobile station is in relation to the charging station. The comparison can be such that a threshold is not allowed to be exceeded. For example, a certain distance value is not allowed to be exceeded. The comparison can be such that, for example, a distance is in the sense of a route taking route information into account or a distance is in the sense of a straight-line distance. Location information in terms of place names and street names or suchlike can also be compared with one another. If the comparison of the location information with the geographical information leads to a comparison result which does not exceed a certain distance value, the corresponding charging station information can at least in part be added to the tuple. Of course, also more than one charging station can satisfy the comparison criterion, so that the tuple can contain charging station information relating to one or more charging stations.

After a comparison has been completed, the tuple can at least in part be sent to the mobile station using the identification of the mobile station. For example, only a part of the tuple can be transmitted dependent on the transmission channel and its bandwidth, for example only the first three or first four data records of the tuple. In addition, dependent on the user specifications, the size of the tuple to be transmitted can be restricted and the tuple can be shortened accordingly after the comparison result.

For the user it is not only important to know whether a charging station is situated nearby, but also whether it is ready for operation. The status of the charging station can be stored in status information. Status information can, for example, be information as to whether a charging station is ready to use or not. In addition, information can be stored in the status information as to whether the charging station is reserved for a certain period of time. Information can also be stored as to whether the charging station is occupied, i.e. whether at the moment that the charge request is made an electric vehicle is charging at this charging station. A remaining charging time can likewise be present in the status information.

Furthermore, it is also to some extent necessary to know which operator operates a charging station. Particularly in the case of users who have only entered into supply contracts with certain operators, it is necessary to know which charging stations are operated by these operators. In this respect, it is also proposed that operator information is also stored in the charging station information. This can be an operator ID, for example.

There are different types of charging strategies and charging mechanisms. The most important are either alternating current (AC) or direct current (DC) charging. Depending on the charging control device inside a vehicle, this is only suitable for AC charging, only for DC charging or for loading with AC and DC. In this respect, it is also necessary to know whether the user's own electric vehicle can be charged at the respective charging station. The charging type is such an item of information which is required for this purpose. Therefore, it is also proposed that the charging type is stored in the charging station information.

Finally, there are a variety of different plugs, for example Type 1, Type 2, Type 3, Combo, Chademo and plugs of other standards. An electric vehicle can be charged at a charging station or not depending on which plug type is supported by this charging station. In this respect, the plug type is also an item of information of a respective charging station which can be stored in its charging station information.

As already explained, the status information is information about whether charging is currently or in the near future possible at a charging station. Current charging availability can, for example, be the current status of a charging station. This can be received from a respective charging station at intervals, preferably regularly and/or in the case of changes. This includes in particular information as to whether the charging station is ready to operate or not or whether a charging process is currently taking place at the charging station. Whether a charging station will be available in the near future, i.e. within a time frame between ten minutes and an hour for example, can also be dependent on reservation information for example. Firstly, how long a currently running charging process still has to run can be contained in the status information. It can be determined from this from which time a charging station will become available. It can be determined from reservation information from which time a charging station is potentially occupied and until which time this potential occupation of the charging station will last. The reservation information can be updated when a reservation is made use of or not. In the latter case, the reservation information can also be deleted. In the former case, the reservation information would be replaced by a charging status, in which the predicted charging duration can be contained.

According to one embodiment, it is proposed that information regarding a charging type of the electric vehicle and/or a plug type of the electric vehicle and/or a user identification and/or a remaining range of the electric vehicle and/or a state of charge of a battery of the electric vehicle is additionally contained in the charge request. As already explained with regard to the information for the charging station, the electric vehicle is also characterised by various characteristics like the charging type and the plug type. In particular, it is necessary that the charging type and the plug type of the electric vehicle correspond to the available charging types and plug types of the charging station. In this respect, this information is necessary in the charge request, so that charging stations which are suitable for the charging requirement can be selected.

A user identification can be used to determine operator information at the control centre and to be able to compare it with operator information from the charge stations as described.

A remaining range of an electric vehicle can be used to adapt the comparison criterion with regard to the location information and the geographical information. It makes no sense including charging stations in the tuple which due to a short remaining range can no longer be reached by the electric vehicle. In this respect, the remaining range is a useful comparison criterion for selecting charging stations.

Finally, the state of charge (SOC) of a battery of the electric vehicle can also be contained in the charge request. It can be calculated from the state of charge, for example, approximately how long a charging process will take. It is only worth displaying charging stations to the user which are available for this period of time plus the journey time of the electric vehicle to the respective charging station and which are still not reserved. Therefore, by means of the state of charge it can be ensured that a battery at a selected charging station can also actually be charged up to a certain state of charge, for example 80%.

The geographical information can preferably be acquired in the mobile station itself or through the mobile network. The mobile station can directly determine the geographical information itself and add it to the charge request. It is also possible for the mobile station to transmit the charge request without geographical information and for the geographical information to be supplemented by the mobile network. Here, it is also conceivable, for example, that that radio cell which receives the charge request adds its identification to it and consequently adds geographical information to the charge request.

According to one embodiment, it is proposed that the tuple dependent on the received charge request is additionally selected such that at least the received information regarding the charging type of the electric vehicle is compared with the charging type of the respective charging station. For example, a selection is made as to which charging stations provide the suitable charging strategy for the electric vehicle. For example, in the case of a DC electric vehicle or an electric vehicle with a charging control device which only allows DC charging, those charging stations can be selected which support DC charging.

It is also proposed that the tuple dependent on the received charge request is selected such that the received information regarding the plug type of the electric vehicle is compared with plug type of the respective charging station. More or fewer electric vehicles can be charged at a charging station depending on which plug types are supported by that charging station. It is necessary for the plug types to correspond to one another and only those charging stations at which the electric vehicle dependent on the plug type can actually charge are added to the tuple.

It is also proposed that the tuple dependent on the received charge request is additionally selected such that the received information of the remaining range of the electric vehicle is compared with location information of the respective charging station. Firstly, for example, a route between the current location of the mobile station or of the electric vehicle and a respective charging station can be determined. Then, it can be checked for which routes the remaining range of the electric vehicle is sufficient. Only those charging stations which are situated within a radius away from the electric vehicle determined by the remaining range can subsequently be added to the tuple.

It is also possible to select the tuple such that an item of operator information is determined dependent on the user identification and is compared with items of operator information of the charging stations. Thus, for example, a plurality of items of operator information can be assigned to a user identification and all those charging stations which correspond to these items of operator information can be added to the tuple. In this way, it is ensured that the customer can also carry out and pay for the charging process at the charging station added to the tuple.

In addition, the tuple dependent on the received charge request is selected such that a desired status for a charging station is compared with status information of the respective charging station. A desired status is usually free or available. The charging station can only be added to the tuple when this status is present. The corresponding charging station information can at least in part be added to the tuple when there is a respective positive comparison result.

In addition to the route between an electric vehicle and a charging station, the traffic situation is also crucial as to whether the electric vehicle will be able to reach the charging station. In this respect, it is also proposed that relative distance information is calculated from the received geographical information together with preferably dynamically stored traffic information and the location information of the respective charging station. The relative distance information can be compared with the remaining range of the electric vehicle and the tuple can only be added to by the information of the respective charging station if the remaining range is greater than the relative distance information.

A user preferably wants to reach the charging station which is quickest available for him or her. In this respect, it can make sense if the charging station information is arranged prioritised in the tuple. Thus, for example, the charging station whose relative distance is the shortest away from the current location of the electric vehicle can be arranged first in the tuple. In addition, dependent on the comparison result a prioritisation can be made such that the greater the match between the charge request and the charging station information the further up in the tuple the corresponding charging station information is arranged.

The tuple with the various charging station information can be transmitted to the mobile station. Within the mobile station, the user can make a selection from the tuple and select a certain charging station. In order to make sure that the charging station selected by the user is also available at that point in time at which he or she will reach the charging station, he or she can transmit the charging station identification of the selected charging station back to the control centre. In this respect, it is proposed that a selected item of charging station information of a charging station selected from the tuple is received from the mobile station and that the charging station identification from the selected charging station is determined. It is also possible for reservation information to be created with the charging station identification for the selected charging station. If a charging station identification of a selected charging station is received at the control centre, then it can be assumed that a user wants to reserve this charging station for his or her charging process. In this respect, when the charging station identification has been received it can be reserved by creating reservation information for this charging station.

The reservation information can, according to one embodiment, contain a reservation duration and/or a start time of a reservation period and/or an end time of a reservation period and/or a duration of a reservation waiting time and/or a user identification. When selecting the charging station, the user can specify when he or she wants to reserve it. This information can serve as the start time of a reservation period and can be added to the reservation information. It is also possible that the user would want to carry out the charging process within a certain time frame. The user can specify this information and this is stored in the reservation information as the reservation period.

It is also possible for a charging duration to be estimated from the remaining range or the state of charge of the battery. From this together with a start time an end time of a reservation period can be calculated.

It is also possible that together with the traffic information the relative distance information is calculated and a journey time which it is estimated the electric vehicle requires to get to a respective charging station is calculated based on the relative distance information. This information can be used as a lower limit for a duration of a reservation waiting time. That is to say, that at least for the duration of the journey time from the current location of the electric vehicle to a respective charging station it is reserved. In addition to the predicted journey time, an extra buffer of several minutes, for example between five minutes and thirty minutes, can be added, so that the duration of a reservation waiting time consists for example, of a predicted journey duration plus fifteen minutes.

It is also possible for the duration of a reservation waiting time to be determined dependent on a price signal. For example, a user can trigger different price signals during the reservation procedure. The higher the price is, the greater a reservation waiting time can be. Here, for example, a user can transmit the selected charging station identification via different recipient numbers. Depending on which number the user chooses, a different duration of a reservation waiting time can result if, for example, a different price signal and hence a different price is assigned to each number. A reservation free of charge can, for example, trigger a five minute reservation waiting time, whereas a reservation at a certain price can trigger a longer duration of a reservation waiting time.

According to one embodiment, it is proposed that, as described, the duration of the reservation waiting time is calculated dependent on the geographical information, the location information and preferably the relative distance information. A predicted journey time from the current location of the electric vehicle to the charging station can be calculated from this and this can be adopted as the lower limit for the duration of the reservation waiting time. For the duration of the reservation waiting time, a charging process can preferably only be activated by the person who initiated the reservation process. The user identification which can be contained in the reservation information can be used for this purpose, for example. If with another user identification a user wants to charge at a charging station, which is within the reservation waiting time, the charging process can be denied, since the user identification is not the correct one. On the other hand, the authorised user can activate the charging process for the duration of the reservation waiting time using his or her user identification.

If after the user has selected a charging station he or she now arrives at the charging station, he or she is able to connect his or her electric vehicle to the charging station. A charge request comprising a charging station identification and a user identification can be generated either via the mobile station or via the electric vehicle or via the connection between the electric vehicle and the charging station. This charge request can be received at the control centre. The received charge request can be compared with user identifications of reservation information which are possibly present. The charging current can only be made available when there is a positive comparison result. If no reservation information is present for the corresponding charging station, the charging current can in any case be made available.

The charge request and/or the selected charging station information and/or the charge requirement can be transmitted from the mobile station via a signaling channel of a mobile network. The use of the signaling channel can be advantageous in that by using different recipient numbers different price signals can be produced. In this way, transmitting the charge request, the selected charging station information or the charge requirement can be subject to fees, which are charged via the mobile network. For example, a fee-chargeable SMS which is transmitted to a certain recipient number could be considered. Different costs can result depending on which recipient number it is sent to.

Sending the charge request and/or the selected charging station information and/or the charge requirement can also trigger a message-specific and/or recipient-specific fee-charging signal in the mobile network. For example, the content or the recipient of such a message can be evaluated and a fee-charging signal correspondingly triggered. The fee-charging signal can be transmitted to a billing centre, in consequence of which a bill can result.

The previously mentioned methods can also be implemented as a computer program or as a computer program stored on a storage medium. Here, on the mobile station or at the control centre a microprocessor can be suitably programmed by a computer program for carrying out the respective method steps.

The features of the methods and devices can be freely combined with one another. In particular, features and part features of the description and/or of the dependent and independent claims, even completely or partly bypassing features or part features of the independent claims, standing alone or freely combined with one another can be inventive in themselves.

BRIEF DESCRIPTION OF THE DRAWINGS

The subject matter is explained in more detail below with the aid of the figures illustrating embodiments.

DETAILED DESCRIPTION

Figure 1:
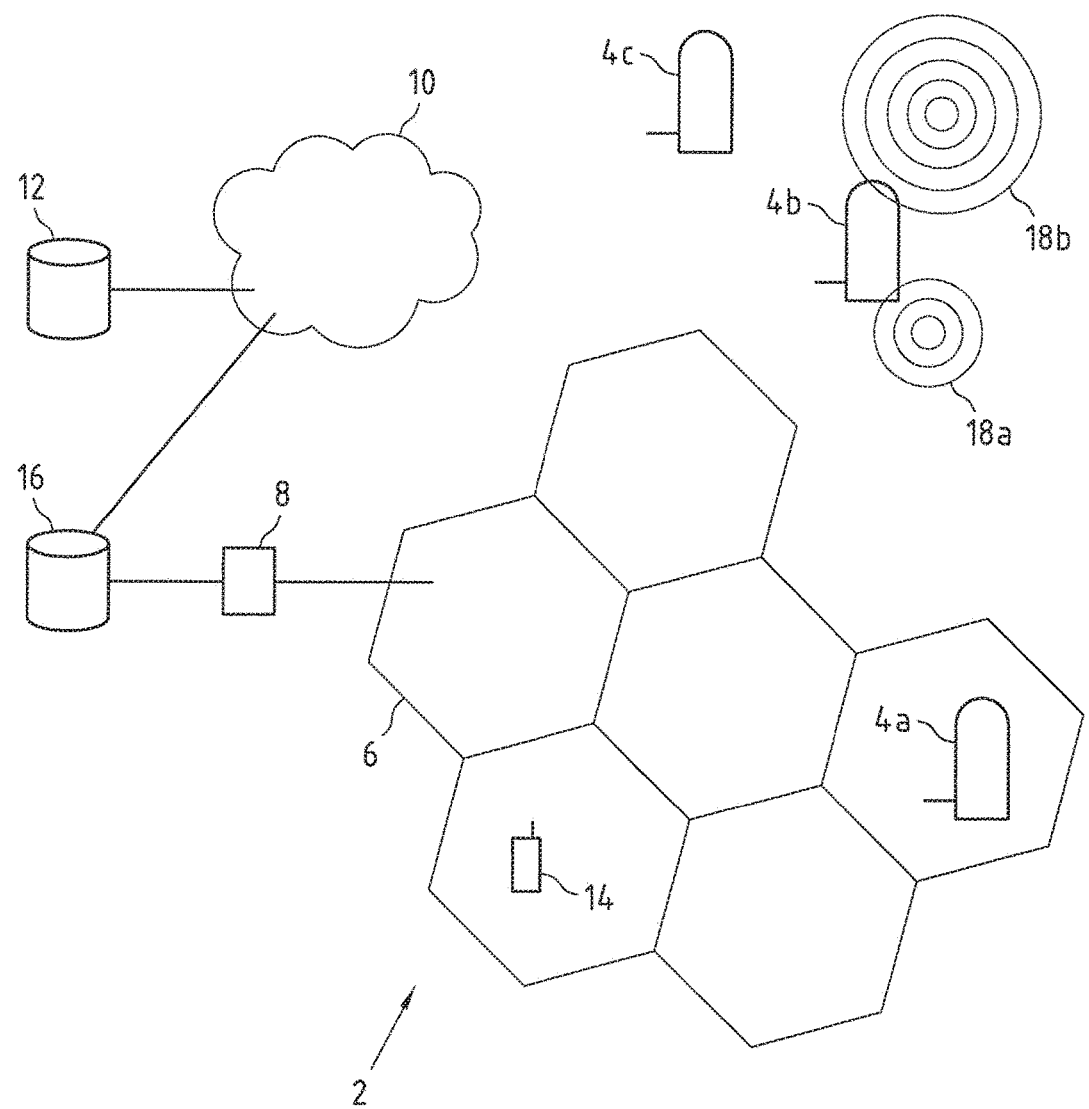
FIG. 1 schematically shows a system for providing information about charging stations.

FIG. 1 shows a system 2 for providing information about charging stations 4a-c. The charging stations are schematically illustrated and normally have a connection to an electric power grid and an outlet for connection to an electric vehicle. In addition, in the charging stations 4 there are sensors for monitoring a charging process. In the charging stations 4 there is also a communication device and a measuring device. The function of a charging station as such is well-known.

A mobile network 6 which is connected to the internet 10 via a gateway 8 is schematically illustrated in FIG. 1. A central computer 12 is connected to the internet 10, for example, and can communicate both with the charging stations 4 and a mobile station 14. An SMS service centre 16 is also illustrated. Finally, the radio range of two WLAN networks 18a, 18b is schematically illustrated.

The central computer 12 enables information about the charging stations 4a-c to be provided to the mobile stations 14. For this purpose, a communication takes place, as is illustrated by way of example in FIG. 2.

Figure 2:
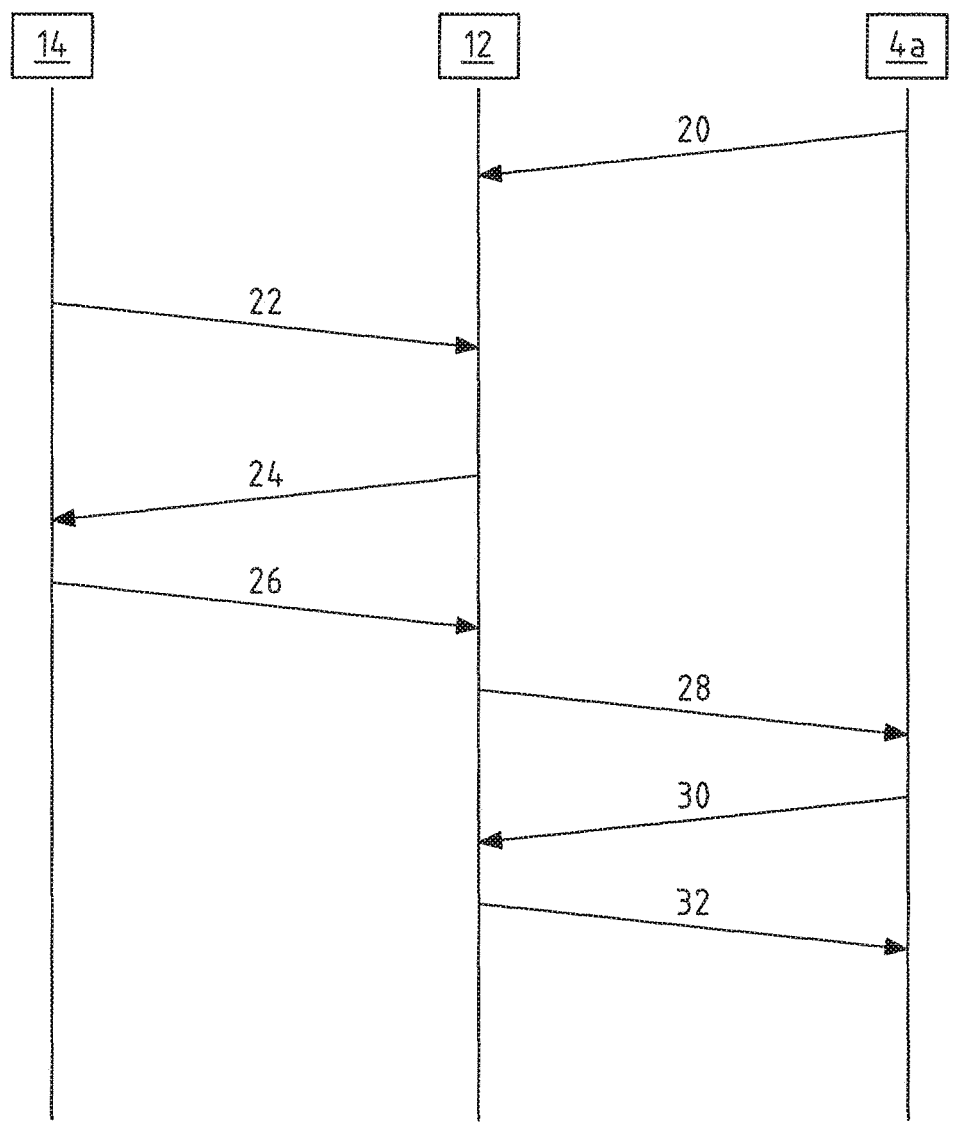
FIG. 2 shows a flow diagram of messages between different elements of the system according to FIG. 1 in accordance with an embodiment.

In FIG. 2, by way of example, only the communication between the charging station 4a and the central computer 12 is illustrated. The charging stations 4b and 4c also correspondingly communicate with the central computer 12.

Firstly, the charging station 4a transmits its charging station identification together with location information to the central computer 12 via the mobile network 6 and the internet 10 (20). Here, status information for the charging station 4a is also included. In addition, operator information, a charging type or a plug type can be contained in this information. The additional information, such as operator information, charging type and plug type of the charging station 4a, can also be determined from a database in the central computer 12 by means of the charging station identification which is transmitted in this step.

Status information can also be transmitted from the charging station 4a to the central computer 12 (20). This information is particularly relevant in the case of a malfunction of the charging station 4a. In addition, in the case where a charging process is spontaneously activated at the charging station 4a, without a previous reservation having taken place, this information about the current charging status can be recorded and the current charging duration contained in the status information. The information in the message 20 can be transmitted at intervals from the charging station 4a to the central computer 12, preferably regularly or only in the case of changes. It should be noted that this information, if it is available, is provided by all charging stations 4a-c to the central computer 12.

Therefore, a current list concerning all charging stations together with their status information, operator information, charging type and plug type, as well as reservation information, is stored in the central computer 12.

If a user wants to find a charging station, then he or she can transmit a charge request (22) to the central computer 12 via his or her mobile station 14. The charge request (22) is transmitted to the central computer 12 via the mobile network 6, the gateway 8 and the internet 10. At least the identification of the mobile station 14 and an item of geographical information for the mobile station 14 are contained in the charge request (22).

In the example shown, the mobile station 14 is in a certain cell of the mobile network 6. If the mobile station 14 knows the cell identification of this cell, this information can already be contained in the charge request (22).

The mobile station 14 can also have a GPS receiver, for example, and can receive GPS coordinates via it. These GPS coordinates can also be transmitted as geographical information to the central computer 12.

It is also possible for the mobile station 14 not to know its own geographical information. When the charge request is transmitted from the mobile station 14 to the central computer 12, it passes through the mobile network 6. In this connection, the message must, for example, firstly be directed via the Base Transceiver Station (BTS) of the respective cell of the mobile network 6. There, for example, location information containing at least the identification of the BTS can be added.

In addition to the location information and the identification of the mobile station, additionally other information about, for example, the charging type of the electric vehicle can be contained in the charge request 22. This information can, for example, be information about whether the electric vehicle can charge using AC and/or DC. Information about the plug type of the electric vehicle can also be contained in the charge request (22). In addition to the identification of the mobile station 14, a further user identification can also be included. The user can also, when he or she is generating the charge request, specify a remaining range of the electric vehicle which can be contained in the charge request (22).

The charge request (22) is received by the central computer 12. The information of the charge request (22) is compared with information of the respective charging station 4a-c. Here, firstly, for example, what the distance is between the mobile station 14 and the respective charging station 4a-c is checked. This distance can be calculated using route information, for example. Additionally, a journey time can be calculated, wherein this calculation can be either only dependent on the route or also dependent on dynamic traffic information. All charging stations 4a-c which lie within the remaining range of the electric vehicle can be preselected. Subsequently, for example, a maximum distance which a charging station 4a-c is allowed to be away from the mobile station 14 in the case at hand can be adopted. All charging stations which satisfy this maximum distance condition are selected further.

Subsequently, the charging stations already selected are filtered dependent on their status. Only available, non-reserved charging stations are filtered out. In addition, a filtering out process is made as to which charging stations support the required charging type and plug type and whether the operator information enables a charging process to be carried out for the respective user. The final remaining charging stations are added to the tuple of charging station information. Here, a prioritisation can be made in the central computer 12 such that the charging station 4a-c with the shortest journey time can be stored as the first charging station 4a-c and in descending order the charging stations 4a-c respectively further away.

Subsequently, on the central computer, the tuple can, for example, be shortened to a maximum of ten entries. This tuple is transmitted back to the mobile station 14 via the internet 10 and the gateway 8 and the mobile network 6 by the central computer 12 (24).

On the mobile station 14, the information from the tuple can be displayed in the order in which it was stored, for example.

The user can subsequently select a charging station from the displayed charging stations. The corresponding selection information can, for example, be transmitted as an SMS from the mobile station 14 to the SMS service centre 16. A certain recipient number can be used for this purpose, for example. A price signal is triggered at the SMS service centre 16 when the SMS is received. This procedure can already be used with the charge request (22). For the sake of simplicity, however, this is only described in connection with the selection.

After the price signal has been produced, the selected charging station information can be transmitted from the SMS service centre 16 via the internet 10 to the control centre 12. In the control centre 12, reservation information can be created. The reservation information can contain the charging station identification and a duration of a reservation. The previously calculated journey time from the mobile station 14 to the charging station 4a can, for example be taken into account in the case of the duration of the reservation. After the reservation information has been calculated, a reservation signal (28) is transmitted from the control centre 12 to the charging station 4a. The charging station 4a can then via suitable means display that there is a reservation.

If the user has now arrived at the charging station 4a, he or she can initiate a charging process. Here, at the charging station 4a, the user identification can already be compared with a user identification from the reservation information. When the comparison result is positive a charging process can be initiated, wherein the charging station 4a and the control centre 12 exchange information relating to the actual charging process (30, 32).

The charging stations 4a-c are not only able to determine their location information from the mobile network 6. In FIG. 1, it is also shown, for example, that the charging station 4b is in the range of two WLAN networks 18a, 18b. The identifications of the WLAN networks can be read by the charging station 4b and used to determine the location. The identifications of the visible WLAN networks 18a, 18b and of the charging station 4b can be transmitted to the control centre 12 for this purpose. At the control centre 12, it can be checked whether geographical information in the form of GPS coordinates is available for the corresponding WLAN identification. If that is the case, this information can also be used as location information for the charging station 4b.

By means of the method shown, it is possible to consolidate all kinds of information about charging stations centrally at a control centre and make it available in a suitable form. By being able to make a reservation, a user in a particularly convenient way can select a charging station and when he or she arrives at the charging station he or she can also actually activate the charging process.

The invention claimed is:

1. A method for providing information about charging stations for electric vehicles, comprising the steps of:
   storing on a central computer, for a plurality of charging stations, charging station information comprising at least one charging station identification assigned to a respective charging station and at least one item of location information assigned to the respective charging station;
   receiving from a mobile station a charge request containing at least one identification of the mobile station and one item of geographical information for the mobile station, wherein the charge request in addition contains information whether the electric vehicle is charged with direct current or alternating current;
   selecting, by the central computer, a tuple of charging station information from the plurality of items of stored charging station information dependent on at least the received charge request such that the received geographical information is compared with the respective location information of the charging stations and when the comparison results that a defined distance value between charging station and mobile station is not exceeded, the corresponding charging station information is at least in part added to the tuple; and
   sending the tuple, at least in part, to the mobile station using the identification of the mobile station.

2. The method of claim 1, wherein the charging station information of the respective charging station additionally comprises information selected from the group consisting of status information, operator information, charging type, plug type, and combinations thereof.

3. The method of claim 2, wherein the status information is at least dependent on information received from a respective charging station and/or reservation information for the respective charging station.

4. The method of claim 2, wherein the charge request comprises additional information regarding the electric vehicle, the additional information begin selected from the group consisting of a charge type of the electric vehicle, a plug type of the electric vehicle, a user identification, a remaining range of the electric vehicle, a state of charge of a battery of the electric vehicle, and combinations thereof.

5. The method of claim 1, wherein the geographical information is acquired in the mobile station or through the mobile network.

6. The method of claim 1, wherein the step of selecting the tuple dependent on the received charge request further comprises selecting the tuple based on at least one of:
- received information regarding a charging type of the electric vehicle compared with a charging type of the respective charging station;
- received information regarding a plug type of the electric vehicle compared with a plug type of the respective charging station;
- received information of a remaining range of the electric vehicle compared with location information of the respective charging station;
- an item of operator information item determined by means of a received user identification and compared with an item of operator information of the respective charging station; and
- a desired status for a charging station compared with status information of the respective charging station and when the comparison results that a defined distance value between mobile station and charging station is not exceeded, the corresponding charging station information is at least in part added to the tuple.

7. The method of claim 1, wherein relative distance information can be calculated from the received geographical information together with dynamically stored traffic information and the location information of the respective charging stations.

8. The method of claim 1, wherein the charging station information is arranged prioritised in the tuple.

9. The method of claim 7, wherein the charging station information is arranged prioritised in the tuple such that the prioritisation is made dependent on the comparison result and/or on the relative distance information.

10. The method of claim 1, wherein a selected item of charging station information of a charging station selected from the tuple is received from the mobile station, and in that the charging station identification from the selected item of charging station information is determined and reservation information is created with the charging station identification for the selected charging station.

11. The method of claim 10, wherein the reservation information contains at least one of:
- a reservation duration;
- a start time of a reservation period;
- an end time of a reservation period;
- a duration of a reservation waiting time; and
- a user identification.

12. The method of claim 11, wherein the duration of the reservation waiting time is calculated dependent on the geographical information, the location information and relative distance information, and/or in that for the duration of the reservation waiting time a charging process can only be activated at the respective charging station with the user identification.

13. The method of claim 1, wherein a charge requirement comprising a charging station identification and a user identification is received, and in that the received charging station identification and user identification is compared with reservation information for the charging station, in particular in that an enabling signal for a charging current is dependent on a comparison result.

14. The method of claim 13, wherein at least one of the charge request, the selected charging station information, and the charge requirement is sent by the mobile station via a signalling channel of a mobile network.

15. The method of claim 14, wherein, by sending from the mobile station at least one of the charge request, the selected charging station information, and the charge requirement, at least one of a message-specific and recipient-specific fee-charging signal is triggered in the mobile network.

16. A system for providing information via charging stations for electric vehicles comprising:
- at least a plurality of charging stations, for which charging station information comprising at least one charging station identification assigned to a respective charging station and at least one item of location information assigned to the respective charging station is stored,
- a control centre set up to receive at least one identification of a mobile station and one charge request containing an item of geographical information for the mobile station,
- wherein the control centre is set up to select a tuple consisting of charging station information from the plurality of charging station information dependent on at least the received charge request such that the received geographical information is compared with the respective location information of the charging stations and when a comparison results that a defined distance value between mobile station and charging station is not exceeded, the corresponding charging station information is at least in part added to the tuple, and
- wherein the control centre is set up to at least in part send the tuple to the mobile station using the identification of the mobile station.

* * * * *